J. M. PHELAN.
SEWER PIPE JOINT.
APPLICATION FILED SEPT. 1, 1909.

1,057,267.

Patented Mar. 25, 1913.

Witnesses

Inventor
John M. Phelan
By O'Meara & Brock
Attorney

UNITED STATES PATENT OFFICE.

JOHN M. PHELAN, OF JACKSON, MICHIGAN, ASSIGNOR TO REINFORCED CONCRETE PIPE COMPANY, OF JACKSON, MICHIGAN, A CORPORATION OF WEST VIRGINIA.

SEWER-PIPE JOINT.

1,057,267.  Specification of Letters Patent.  Patented Mar. 25, 1913.

Application filed September 1, 1909. Serial No. 515,604.

*To all whom it may concern:*

Be it known that I, JOHN M. PHELAN, a citizen of the United States, residing at Jackson, in the county of Jackson and State of Michigan, have invented a new and useful Improvement in Sewer-Pipe Joints, of which the following is a specification.

This invention relates to an interlocking joint for concrete pipes in which the pipe is provided with an exterior joint upon the outside, said joint being formed by a semi-annular groove which is filled with cement after the pipe sections are fitted together, and with a bottom joint formed upon the inside of the pipe.

Figure 1:
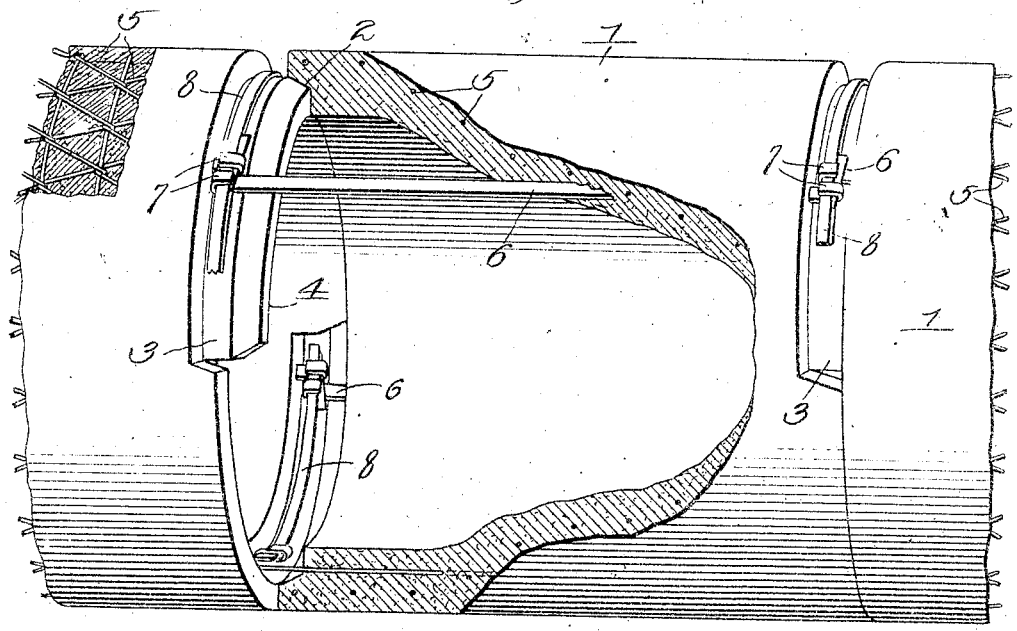
Figure 2:
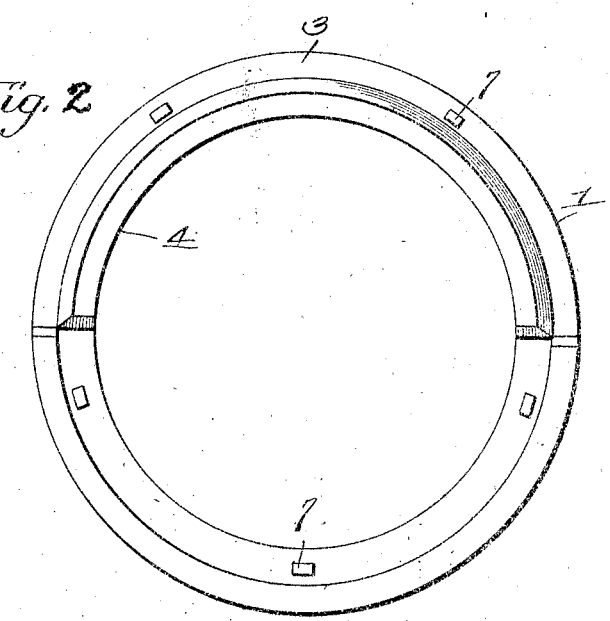

In the accompanying drawings: Figure 1 is a perspective view, partly in section illustrating one of my joints. Fig. 2 is an end view of the pipe section.

In these drawings 1 represents a section of concrete pipe, one end of which is provided with an annular, beveled recess 2, which recess leaves a projecting circumferential flange, the periphery of which is a smooth continuation of the exterior surface of the pipe section. At the opposite end the pipe section is cut out as shown providing an inner flange 3, throughout one half of its circumference, said cut out portion having a depth equal to the thickness of the extreme end of the flange above referred to, and this end of the pipe is also provided with a semi-annular shoulder 4 which is co-extensive with the flange 3 and the inner face of which forms a continuation of the interior wall of the pipe. The width of this shoulder is equal to the width of the flange 3, plus the width of the recess 2, and is beveled to fit into said recess.

In laying the pipe the shoulder 4 is considered as the top of the pipe and when the sections are fitted together, there will be left a semi-annular groove running around the upper half of the pipe upon its outside and a similar groove running around one-half of the pipe in its lower or bottom portion, and accessible only from the inside. The advantages of this construction are two-fold: The outer groove can be readily filled with cement from the outside, while the inner groove can be readily filled by a workman upon the inside of the pipe. It will be obvious that with a complete exterior groove it would be difficult to fill in the groove at the bottom of the pipe where the pipe rested directly upon the bottom of a trench, and practically impossible unless the trench was considerably wider than the pipe.

A further advantage of this invention lies in the fact that as the pipe sections are brought together, any obstruction or material which does not belong within the pipe may be pushed therefrom through the lower portion of the pipe before the sections are finally locked together, which would be difficult if the shoulder 4 extended entirely around the pipe. I have also shown a wire net work 5 which is in the form of a cylinder and which is embedded in the pipe, and between this net-work and the interior of the pipe run longitudinal metal bands 6 the ends of which are bent to form hooks 7 which hooks project from the ends of the pipe and engage semi-cylindrical bands 8 which rest respectively in the outer and inner, upper and lower grooves.

Having thus fully described my invention, what I claim as new and desire to secure by Letters Patent is:—

A concrete pipe section one end of which is provided with an annular, beveled recess thereby leaving a projecting circumferential flange, the periphery of which is a continuation of the exterior surface of the pipe section, the opposite end of said section being cut out throughout one-half of its circumference providing an inner semi-circumferential flange, said flange being provided with a semi-annular shoulder co-extensive with the flange, the inner face of said shoulder forming a continuation of the interior wall of the pipe section and said shoulder projecting beyond the lower half of the said pipe section, the shoulder of one pipe section being adapted to enter the recess of an adjacent section.

JOHN M. PHELAN.

Witnesses:
 WM. J. SAMELS,
 PETER B. LOOMIS.